(12) United States Patent
Dunn et al.

(10) Patent No.: US 11,854,440 B2
(45) Date of Patent: Dec. 26, 2023

(54) MIRROR HAVING AN INTEGRATED ELECTRONIC DISPLAY

(71) Applicant: Manufacturing Resources International, Inc., Alpharetta, GA (US)

(72) Inventors: William Dunn, Alpharetta, GA (US); Michael LeCave, Gainesville, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 750 days.

(21) Appl. No.: 16/852,159

(22) Filed: Apr. 17, 2020

(65) Prior Publication Data

US 2020/0242980 A1   Jul. 30, 2020

Related U.S. Application Data

(63) Continuation of application No. 15/636,813, filed on Jun. 29, 2017, now Pat. No. 10,692,407.

(Continued)

(51) Int. Cl.
*G09F 13/12* (2006.01)
*G09F 23/00* (2006.01)
(Continued)

(52) U.S. Cl.
CPC .............. *G09F 23/00* (2013.01); *G03B 21/56* (2013.01); *G09F 13/0404* (2013.01);
(Continued)

(58) Field of Classification Search
CPC . G09F 13/12; G09F 9/33; G09F 13/18; G09F 13/08; G09F 13/0404; G09F 13/14; G03B 21/56
See application file for complete search history.

(56) References Cited

U.S. PATENT DOCUMENTS 2,203,244 A * 6/1940 Ernest ..................... G09F 13/12
40/577
3,629,972 A   12/1971 Rehberg et al.
(Continued)

FOREIGN PATENT DOCUMENTS

AU   2015277337 B2   9/2018
AU   2017225781 B2   7/2019
(Continued)

OTHER PUBLICATIONS

A. Vogler & H. Kunkley, Photochemistry and Beer, Jan. 1982, 3 Pages, vol. 59, No. 1.
(Continued)

*Primary Examiner* — Cassandra Davis
(74) *Attorney, Agent, or Firm* — STANDLEY LAW GROUP LLP; Jeffrey S. Standley; Adam J. Smith

(57) ABSTRACT

Systems and methods for presenting images on mirrored displays are provided. A cover layer having a surface area is positioned in front of an electronic display having a viewing area. A reflective material is located at the cover layer and is less than fully reflective where the cover layer is located above the viewing area. The mirrored display is configured to operate in a low power mode until a sensor detects a person proximate to the mirrored display and then operate in a normal power mode.

17 Claims, 6 Drawing Sheets

Related U.S. Application Data

(60) Provisional application No. 62/360,175, filed on Jul. 8, 2016.

(51) Int. Cl.

| | | |
|---|---|---|
| *G03B 21/56* | (2006.01) | |
| *G09F 13/04* | (2006.01) | |
| *G09F 13/08* | (2006.01) | |
| *G09F 13/14* | (2006.01) | |
| *G09F 13/18* | (2006.01) | |

(52) U.S. Cl.
CPC .............. *G09F 13/08* (2013.01); *G09F 13/12* (2013.01); *G09F 13/14* (2013.01); *G09F 13/18* (2013.01)

(56) References Cited

U.S. PATENT DOCUMENTS

| | | |
|---|---|---|
| 4,040,726 A | 8/1977 | Paca |
| 4,299,092 A | 11/1981 | Ibrahim |
| 4,371,870 A | 2/1983 | Biferno |
| 4,738,042 A | 4/1988 | Corden et al. |
| 4,853,678 A | 8/1989 | Bishop, Jr. et al. |
| 4,950,344 A | 8/1990 | Glover et al. |
| 5,372,416 A | 12/1994 | Shapley et al. |
| 7,413,233 B1 | 8/2008 | Jung |
| 7,455,412 B2 | 11/2008 | Rottcher |
| 7,513,637 B2 | 4/2009 | Kelly et al. |
| 7,755,611 B2 * | 7/2010 | Barr .................. G06F 1/1601 |
| | | 345/173 |
| 7,922,381 B2 | 4/2011 | Han et al. |
| 8,254,121 B2 | 8/2012 | Lee et al. |
| 8,417,376 B1 | 4/2013 | Smolen |
| 8,578,081 B1 | 11/2013 | Fils |
| 8,683,745 B2 | 4/2014 | Artwohl et al. |
| 8,982,013 B2 | 3/2015 | Sako et al. |
| 8,988,635 B2 | 3/2015 | Dunn et al. |
| 9,052,536 B2 | 6/2015 | Artwohl et al. |
| 9,155,405 B2 | 10/2015 | Artwohl et al. |
| 9,173,509 B2 | 11/2015 | Mischel, Jr. et al. |
| 9,500,801 B2 | 11/2016 | Dunn |
| 9,500,896 B2 | 11/2016 | Dunn et al. |
| 9,514,661 B2 | 12/2016 | Riegel |
| 9,519,185 B2 | 12/2016 | Dunn et al. |
| 9,526,352 B2 | 12/2016 | Dunn et al. |
| 9,535,293 B2 | 1/2017 | Dunn |
| 9,633,366 B2 | 4/2017 | Dunn |
| 9,661,939 B2 | 5/2017 | Dunn et al. |
| 9,684,124 B2 | 6/2017 | Dunn |
| 9,733,420 B2 | 8/2017 | Dunn et al. |
| 9,832,847 B2 | 11/2017 | Dunn et al. |
| 9,881,528 B2 | 1/2018 | Dunn |
| 9,983,427 B2 | 5/2018 | Dunn |
| 10,052,026 B1 | 8/2018 | Tran |
| 10,182,665 B2 | 1/2019 | Dunn et al. |
| 10,258,170 B2 | 4/2019 | Dunn et al. |
| 10,269,038 B2 | 4/2019 | Dunn |
| 10,297,178 B2 | 5/2019 | Park et al. |
| 10,417,943 B2 | 9/2019 | Dunn |
| 10,455,671 B2 | 10/2019 | Dunn et al. |
| 10,467,844 B2 | 11/2019 | Diaz |
| 10,555,406 B2 | 2/2020 | Dunn et al. |
| 10,595,648 B2 | 3/2020 | Dunn et al. |
| 2002/0064037 A1 | 5/2002 | Lee |
| 2002/0075552 A1 | 6/2002 | Poll et al. |
| 2002/0187575 A1 | 12/2002 | Maruyama et al. |
| 2003/0062813 A1 | 4/2003 | Cording |
| 2003/0117790 A1 | 6/2003 | Lee et al. |
| 2003/0139169 A1 | 7/2003 | Arreasola, Jr. |
| 2004/0148055 A1 | 7/2004 | Shoenfeld |
| 2004/0160388 A1 | 8/2004 | O'Keeffe |
| 2005/0195972 A1 | 9/2005 | Barr |
| 2005/0265019 A1 | 12/2005 | Sommers et al. |
| 2006/0012985 A1 | 1/2006 | Archie, Jr. et al. |
| 2006/0215958 A1 | 9/2006 | Yeo et al. |
| 2006/0242867 A1 | 11/2006 | Choi |
| 2006/0284788 A1 | 12/2006 | Robinson et al. |
| 2007/0047214 A1 | 3/2007 | Nesterenko et al. |
| 2007/0151274 A1 | 7/2007 | Roche et al. |
| 2007/0171647 A1 | 7/2007 | Artwohl et al. |
| 2007/0195535 A1 | 8/2007 | Artwohl et al. |
| 2007/0214812 A1 | 9/2007 | Wagner et al. |
| 2007/0288332 A1 | 12/2007 | Naito |
| 2008/0024047 A1 | 1/2008 | Juo et al. |
| 2008/0042554 A1 | 2/2008 | Komoto et al. |
| 2008/0055534 A1 | 3/2008 | Kawano |
| 2008/0094854 A1 | 4/2008 | Coleman et al. |
| 2008/0165526 A1 | 7/2008 | Saraiji et al. |
| 2008/0284942 A1 | 11/2008 | Mahama et al. |
| 2008/0295033 A1 | 11/2008 | Lee et al. |
| 2009/0002990 A1 | 1/2009 | Becker et al. |
| 2009/0015400 A1 | 1/2009 | Breed |
| 2009/0097227 A1 | 4/2009 | Kim et al. |
| 2009/0121970 A1 | 5/2009 | Ozbek |
| 2009/0178427 A1 | 7/2009 | Eichman |
| 2009/0213579 A1 | 8/2009 | Saraiji et al. |
| 2009/0225519 A1 | 9/2009 | Mischel, Jr. et al. |
| 2009/0244884 A1 | 10/2009 | Trulaske, Sr. |
| 2009/0278766 A1 | 11/2009 | Sako et al. |
| 2009/0298547 A1 | 12/2009 | Kim et al. |
| 2009/0300953 A1 | 12/2009 | Frisch et al. |
| 2010/0026912 A1 | 2/2010 | Ho |
| 2010/0058628 A1 | 3/2010 | Reid et al. |
| 2010/0118200 A1 | 5/2010 | Gelman et al. |
| 2010/0162747 A1 | 7/2010 | Hamel et al. |
| 2010/0189571 A1 | 7/2010 | Coonrod |
| 2010/0238394 A1 | 9/2010 | Dunn |
| 2010/0275477 A1 | 11/2010 | Kim |
| 2010/0293827 A1 | 11/2010 | Suss et al. |
| 2010/0309687 A1 | 12/2010 | Sampsell et al. |
| 2011/0056102 A1 | 3/2011 | Reid et al. |
| 2011/0083460 A1 | 4/2011 | Thomas et al. |
| 2011/0116000 A1 | 5/2011 | Dunn et al. |
| 2011/0116231 A1 | 5/2011 | Dunn et al. |
| 2011/0261282 A1 | 10/2011 | Jean et al. |
| 2011/0302944 A1 | 12/2011 | Howington et al. |
| 2012/0020560 A1 | 1/2012 | Zarubinsky |
| 2012/0062080 A1 | 3/2012 | Maslen |
| 2012/0105424 A1 | 5/2012 | Lee et al. |
| 2012/0105428 A1 | 5/2012 | Fleck et al. |
| 2012/0206500 A1 | 8/2012 | Koprowski et al. |
| 2012/0206941 A1 | 8/2012 | He |
| 2012/0285089 A1 | 11/2012 | Artwohl et al. |
| 2012/0287368 A1 | 11/2012 | Que et al. |
| 2012/0287379 A1 | 11/2012 | Koike |
| 2013/0016296 A1 | 1/2013 | Fujita et al. |
| 2013/0063326 A1 | 3/2013 | Riegel |
| 2013/0063676 A1 | 3/2013 | Tsuchihashi et al. |
| 2013/0120815 A1 | 5/2013 | Aspnes et al. |
| 2013/0151006 A1 | 6/2013 | Garson et al. |
| 2013/0158703 A1 | 6/2013 | Lin et al. |
| 2013/0208447 A1 | 8/2013 | Maslen |
| 2013/0211583 A1 | 8/2013 | Borra |
| 2013/0265525 A1 | 10/2013 | Dunn et al. |
| 2013/0271674 A1 | 10/2013 | Liu et al. |
| 2013/0271696 A1 | 10/2013 | Dunn |
| 2014/0062316 A1 | 3/2014 | Tischler et al. |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0137065 A1 | 5/2014 | Feng et al. |
| 2014/0144083 A1 | 5/2014 | Artwohl et al. |
| 2014/0204452 A1 | 7/2014 | Branson |
| 2014/0285732 A1 | 9/2014 | Tanabe et al. |
| 2014/0300979 A1 | 10/2014 | Tomida et al. |
| 2014/0320950 A1 | 10/2014 | Saxe et al. |
| 2014/0333541 A1 | 11/2014 | Lee et al. |
| 2015/0035432 A1 | 2/2015 | Kendall et al. |
| 2015/0172385 A1 | 6/2015 | Kuroyama et al. |
| 2015/0177480 A1 | 6/2015 | Bullock et al. |
| 2015/0247968 A1 | 9/2015 | Verrat-Debailleul et al. |
| 2015/0250021 A1 | 9/2015 | Stice et al. |
| 2015/0253612 A1 | 9/2015 | Hasegawa et al. |

(56) References Cited

U.S. PATENT DOCUMENTS

| | | |
|---|---|---|
| 2015/0300628 A1 | 10/2015 | Dunn et al. |
| 2015/0309263 A2 | 10/2015 | Abovitz et al. |
| 2015/0338715 A1 | 11/2015 | Schaefer et al. |
| 2015/0362667 A1 | 12/2015 | Dunn |
| 2015/0362768 A1 | 12/2015 | Dunn |
| 2015/0362792 A1 | 12/2015 | Dunn et al. |
| 2015/0363819 A1 | 12/2015 | Dunn |
| 2015/0366083 A1 | 12/2015 | Dunn et al. |
| 2016/0037657 A1 | 2/2016 | Yoshizumi |
| 2016/0061514 A1 | 3/2016 | Seo et al. |
| 2016/0091755 A1 | 3/2016 | Dunn |
| 2016/0095450 A1 | 4/2016 | Trulaske, Sr. |
| 2016/0103275 A1 | 4/2016 | Diaz et al. |
| 2016/0106231 A1 | 4/2016 | Dunn et al. |
| 2016/0192451 A1 | 6/2016 | Dunn et al. |
| 2017/0010771 A1 | 1/2017 | Bernstein et al. |
| 2017/0046991 A1 | 2/2017 | Riegel |
| 2017/0053456 A1 | 2/2017 | Cho et al. |
| 2017/0068042 A1 | 3/2017 | Dunn et al. |
| 2017/0068044 A1 | 3/2017 | Dunn |
| 2017/0099960 A1 | 4/2017 | Dunn et al. |
| 2017/0108735 A1 | 4/2017 | Dunn |
| 2017/0228770 A1 | 8/2017 | Dunn |
| 2017/0256115 A1 | 9/2017 | Diaz |
| 2017/0329078 A1 | 11/2017 | Dunn et al. |
| 2018/0012526 A1 | 1/2018 | Dunn et al. |
| 2018/0020847 A1 | 1/2018 | Dunn et al. |
| 2018/0035521 A1 | 2/2018 | Dunn et al. |
| 2018/0151097 A1 | 5/2018 | Dunn |
| 2018/0368240 A1 | 12/2018 | Dunn et al. |
| 2019/0125102 A1 | 5/2019 | Dunn et al. |
| 2019/0205922 A1 | 7/2019 | Dunn |
| 2019/0362585 A1 | 11/2019 | Diaz |

FOREIGN PATENT DOCUMENTS

| | | |
|---|---|---|
| AU | 2018219976 B2 | 11/2019 |
| AU | 2017293369 B2 | 3/2020 |
| CA | 2815355 A1 | 5/2012 |
| CA | 2952619 C | 4/2019 |
| CA | 3007799 C | 9/2019 |
| CA | 3007801 C | 9/2019 |
| CN | 101949526 A | 1/2011 |
| CN | 102214414 A | 10/2011 |
| CN | 202775364 U | 3/2013 |
| CN | 202815379 U | 3/2013 |
| EP | 3023975 A1 | 5/2016 |
| EP | 3155607 A1 | 4/2017 |
| EP | 3422907 | 1/2019 |
| EP | 3155607 B1 | 4/2019 |
| EP | 3481561 A1 | 5/2019 |
| EP | 3550547 A1 | 10/2019 |
| GB | 2232520 A | 12/1990 |
| JP | H9-160512 A | 6/1997 |
| JP | 2005-224267 A | 8/2005 |
| JP | 2006-126379 A | 5/2006 |
| JP | 2006-522945 A | 10/2006 |
| JP | 2008180502 A | 8/2008 |
| JP | 2008299660 A | 12/2008 |
| JP | 2010-54718 A | 3/2010 |
| JP | 3158578 U | 4/2010 |
| JP | 2010171010 A | 8/2010 |
| JP | 2010-273935 A | 12/2010 |
| JP | 2012-16086 A | 1/2012 |
| JP | 2012-53875 A | 3/2012 |
| JP | 2012-255847 A | 12/2012 |
| JP | 5173088 B1 | 1/2013 |
| JP | 2014-71343 A | 4/2014 |
| JP | 2014-81483 A | 5/2014 |
| JP | 2014-228777 A | 12/2014 |
| JP | 3196837 U | 3/2015 |
| JP | 2015-231454 A | 12/2015 |
| JP | 5939603 B1 | 5/2016 |
| JP | 2017531198 A | 10/2017 |
| JP | 2019-66874 A | 4/2019 |
| JP | 2019-513251 A | 5/2019 |
| KR | 1020040045939 A | 6/2004 |
| KR | 10-2011-0040909 A | 4/2011 |
| KR | 1020110119360 A | 11/2011 |
| KR | 1020120044874 A | 5/2012 |
| KR | 10-2012-0081330 A | 7/2012 |
| KR | 10-2013-0003384 A | 1/2013 |
| KR | 10-2015-0128134 A | 11/2015 |
| KR | 10-1987410 B1 | 6/2019 |
| KR | 10-2047032 B1 | 11/2019 |
| WO | WO2006055873 A2 | 5/2006 |
| WO | WO2008/108558 A1 | 9/2008 |
| WO | WO2010116202 A1 | 10/2010 |
| WO | WO2013056109 A1 | 4/2013 |
| WO | WO2014006490 A1 | 1/2014 |
| WO | WO2015195681 A1 | 12/2015 |
| WO | WO2016021751 A1 | 2/2016 |
| WO | WO2017151934 A1 | 9/2017 |
| WO | WO2018009399 A1 | 1/2018 |

OTHER PUBLICATIONS

Dave Roos, How Transmissive Film Works, 2008, 9 Pages.
Pilkington Tec Glass, For the Refrigeration Market, 2002, 2 Pages.

* cited by examiner

DETAILED DESCRIPTION OF EXEMPLARY EMBODIMENT(S)# MIRROR HAVING AN INTEGRATED ELECTRONIC DISPLAY

CROSS REFERENCE TO RELATED APPLICATIONS

This application is a continuation of U.S. Nonprovisional patent application Ser. No. 15/636,813 filed Jun. 29, 2017, which claims the benefit of U.S. Provisional Patent Application No. 62/360,175 filed Jul. 8, 2016, the disclosures of each of which are hereby incorporated by reference in their entireties.

TECHNICAL FIELD

Embodiments of the present invention generally relate to electronic displays.

BACKGROUND AND SUMMARY OF THE INVENTIVE CONCEPT

Mirrors are used for utilitarian and decorative purposes and are often placed in retail locations for both purposes. For example, mirrors are placed in dressing rooms or near retail items so that a person may view the fit and look of the product on themselves before purchasing. Two way mirrors (sometimes also referred to as one way mirrors) present a semi-transparent view from one side of the mirror and a semi-reflective view from the other side of the mirror. These mirrors are used by police in interrogation rooms, for example, so that the investigators or witnesses may observe the person being interrogated but the person being interrogated cannot view the observers. These mirrors are also used, for example, by stores to mask the direction of a security camera lens, as well as many other applications.

Advertising displays have long been used in retail locations to promote various products and services. These advertising displays may be static posters or images displayed on electronic displays.

Exemplary embodiments of the mirrored display relate to an optical stack having an intergrated electronic display. The optical stack may be a two way mirror with the electronic display mounted therebehind such that the image displayed on the electronic display can be shown through the optical stack when the electronic display is illuminated. When the electronic display is not illuminated, the optical stack may appear as a reflective surface. The mirrored display may also comprise a video player, a timing and control board, and other components that are electrically connected to the electronic display and configured control static or video images displayed on the electronic display.

In other exemplary embodiments, the electronic display may be a capacitive touch screen display. The mirrored display may further comprise a processor that receives a user's input and updates the displayed image based on the user's input. For example and not to serve as a limitation, the user may select various clothing items for display on the mirrored display such that the user can see a visual depiction of the clothing item on the user without having to actually wear the clothing item. The mirrored display may include a sensor that detects when a person is in view of the mirrored display and operate the electronic display accordingly.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
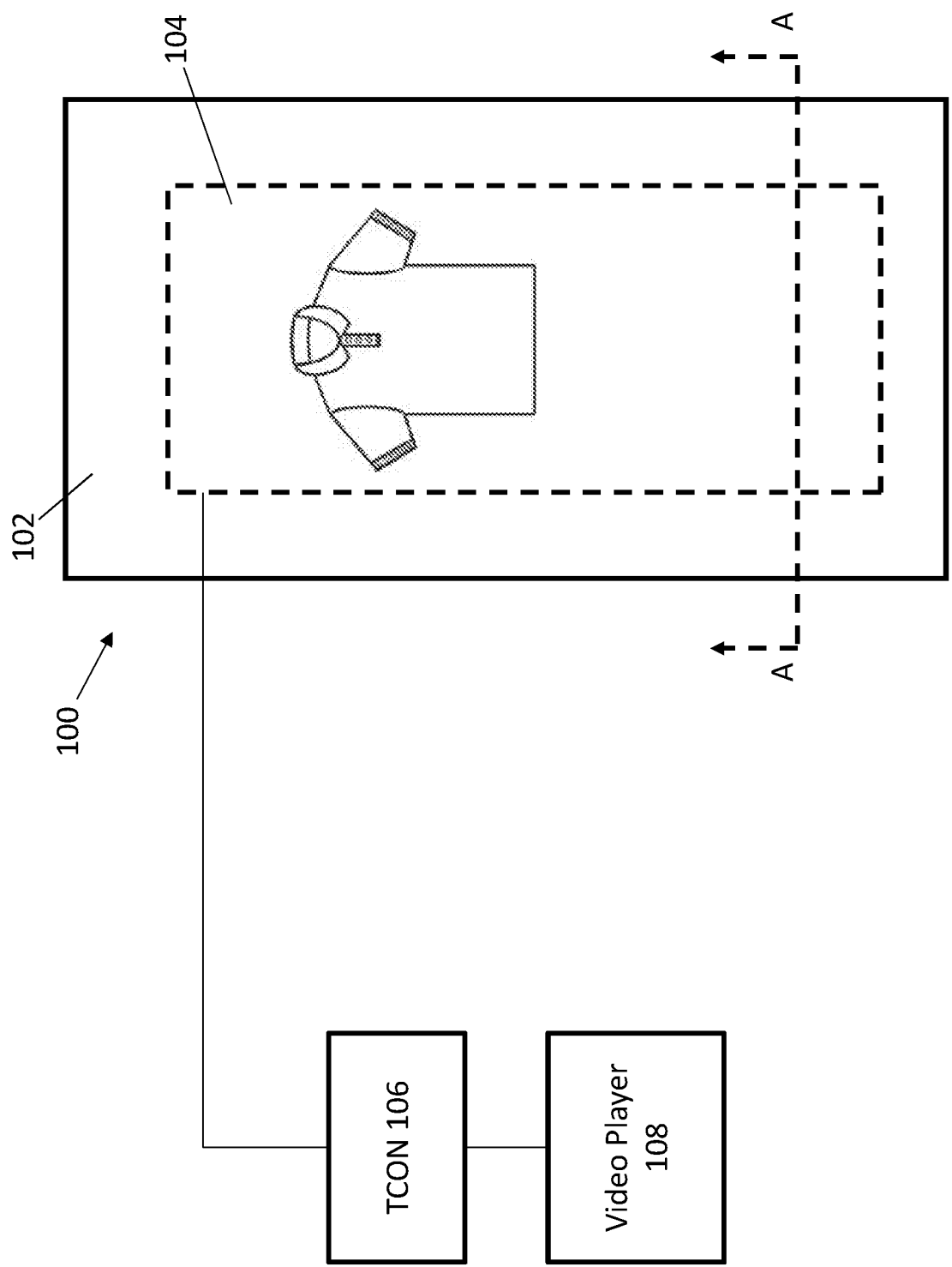
FIG. 1 is a simplified block diagram of an exemplary embodiment of the mirrored display also indicating section line A-A.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is well known that electronic display such as the ones described herein are capable of displaying static images as well as video. As used herein, the terms are interchangeable, since the functionality of the device is the same as it relates to the exemplary embodiments.

FIG. 1 In an exemplary embodiment the mirrored display 100 comprises an optical stack 102 and an electronic display 104. The mirrored display 100 may comprise a cabinet or housing that frames and secures the optical stack 102 such that the reflective surface faces a user/viewer, the cabinet may also secure other components of the mirrored display 100. The mirrored display 100 and the optical stack 102 may be any size and shape relative to one another. The optical stack 102 may contain one or more reflective materials such as, but not limited to, silver, tin, nickel, mercury, aluminum, aluminum oxides, gold, chrome, silicon oxides, silicon nitrides, some combination thereof, or the like. The partially silver or half silvered mirror may also be accomplished by organizing the die-electric optical coating components in such an order to result non-conductive "silvered" appearing mirror.

The optical stack 102 may be a two-way (aka and hereinafter also one-way) mirror design. To accomplish the two-way mirror design, the optical stack 102 may be partially silvered. In exemplary embodiments, the optical stack 102 may be substantially half silvered. In this way, when some or all of the electronic display 104 is illuminated, the image displayed thereon may appear through the optical stack 102 and the unilluminated portions of the electronic display 104 and the optical stack 102 may appear as a reflective surface.

The electronic display 104 may be mounted inside the mirrored display 100 behind the optical stack 102. In exemplary embodiments, the electronic display 102 has a smaller surface area than the total surface area of the mirrored display 100, though any size and shape electronic display 104 is contemplated. The electronic display 104 may be any type of electronic display 104 such as, but not limited to, a Liquid Crystal Display (LCD), a Light Emitting Diode (LED), Organic LED (OLED), electroluminescent polymer display, or the like. In exemplary embodiments, only the portion of the optical stack 102 having the electronic display 104 located thereunder may be of the two-way design, while the remaining portions of the optical stack 102 may be of a normal mirrored (i.e., substantially fully silvered) surface. In other exemplary embodiments, the entire optical stack 102 may be of the two-way design.

In exemplary embodiments, the optical stack 102 may comprise a reflective layer 205. The reflective layer 205 may be substantially coextensive with the optical stack 102. The reflective layer 205 may be comprised of reflective materials such that it is partially silvered or half silvered. In exemplary embodiments, the reflective layer 205 is partially silvered where the reflective layer 205 is located above the electronic display 104 or the viewing area and substantially fully silvered on the remaining surface thereof.

The electronic display 104 may be in electrical connection with a timing and control board (TCON) 106 which may be in electrical connection with a video player 108. The TCON 106 and video player 108 may be mounted in the cabinet for the optical stack 102 or may be located remotely. The TCON 106 and video player 108 may control the images displayed on the electronic display 104. For example, and not intended to be limiting, a general advertising image can be displayed anywhere on the electronic display 104. Alternatively, the image of a clothing item may be displayed on the mirrored display 100, and sized/positioned over the reflection of the viewer such that the viewer can see a visual depiction of how the clothing item would fit and appear on their body without having to actually try the clothing item on.

Figure 2:
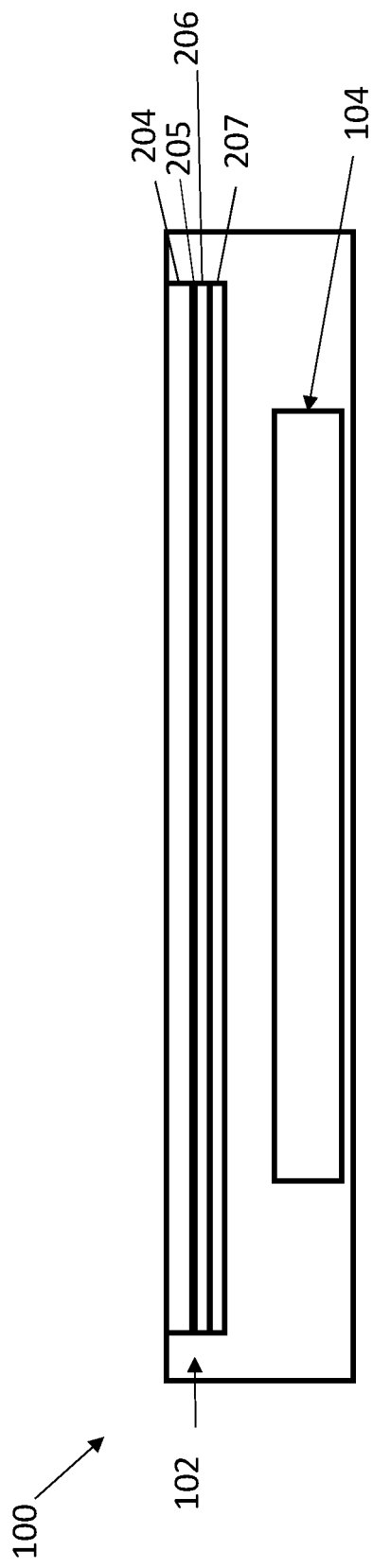
FIG. 2 is a detailed sectional view taken along section line A-A of FIG. 1.

FIG. 2 A detailed sectional view taken along section line A-A of FIG. 1 reveals the various layers that comprise the optical stack 102 and the electronic display 104 of the mirrored display 100. The section line A-A preferably cuts horizontally through the indicated portion of the mirrored display 100. A glass panel 204 may form the outermost layer of the optical stack 102. A first optical film 206 is preferably bonded to the rear surface of the glass panel 204, preferably with index-matching optical adhesive. A second optical film 207 may be bonded to the rear surface of the first optical film 206, again preferably using an index-matched optical adhesive. In an exemplary embodiment, the second optical film 207 may contain an anti-reflective coating on one or both sides. In some alternative embodiments, one or both sides of the first optical film 206 may contain an anti-reflective coating. Additionally, the outermost face of the glass panel 204 may also contain an anti-reflective coating. Preferably, the first optical film 206 may be a zero retardation film such as TAC, or a XENOR zero retardation film, or a linear polarizer. Also preferably, the second optical film 207 would be a linear polarizer. However, in some embodiments, the second optical film 207 would instead be a projective capacitance touch screen, comprising one or two layers of low birefringent or zero retardation films.

The reflective layer 205 may be integrally formed with, positioned on, or located adjacent to the glass panel 204, and may be partially silvered on the portions that are located above the electronic display 104 and substantially full silvered on the portions where the electronic display 104 is not located thereunder. In other exemplary embodiments, the entire optical stack 102 is partially silvered or the reflective layer 205 may be located anywhere in the optical stack 102. The rear surface of the glass panel 204 may be painted black or backed with or otherwise mounted above a fully or partially opaque layer in the locations where the electronic display 104 is not located thereunder. This may improve reflectivity of the optical stack 102.

The electronic display 104 may be located below the optical stack 102 and may be comprised of a series of layers, the specifics being dependent upon the type of electronic display 104 chosen. In an exemplary embodiment, the electronic display 104 comprises a liquid crystal stack with a backlight positioned to illuminate the liquid crystal stack.

Figure 3:
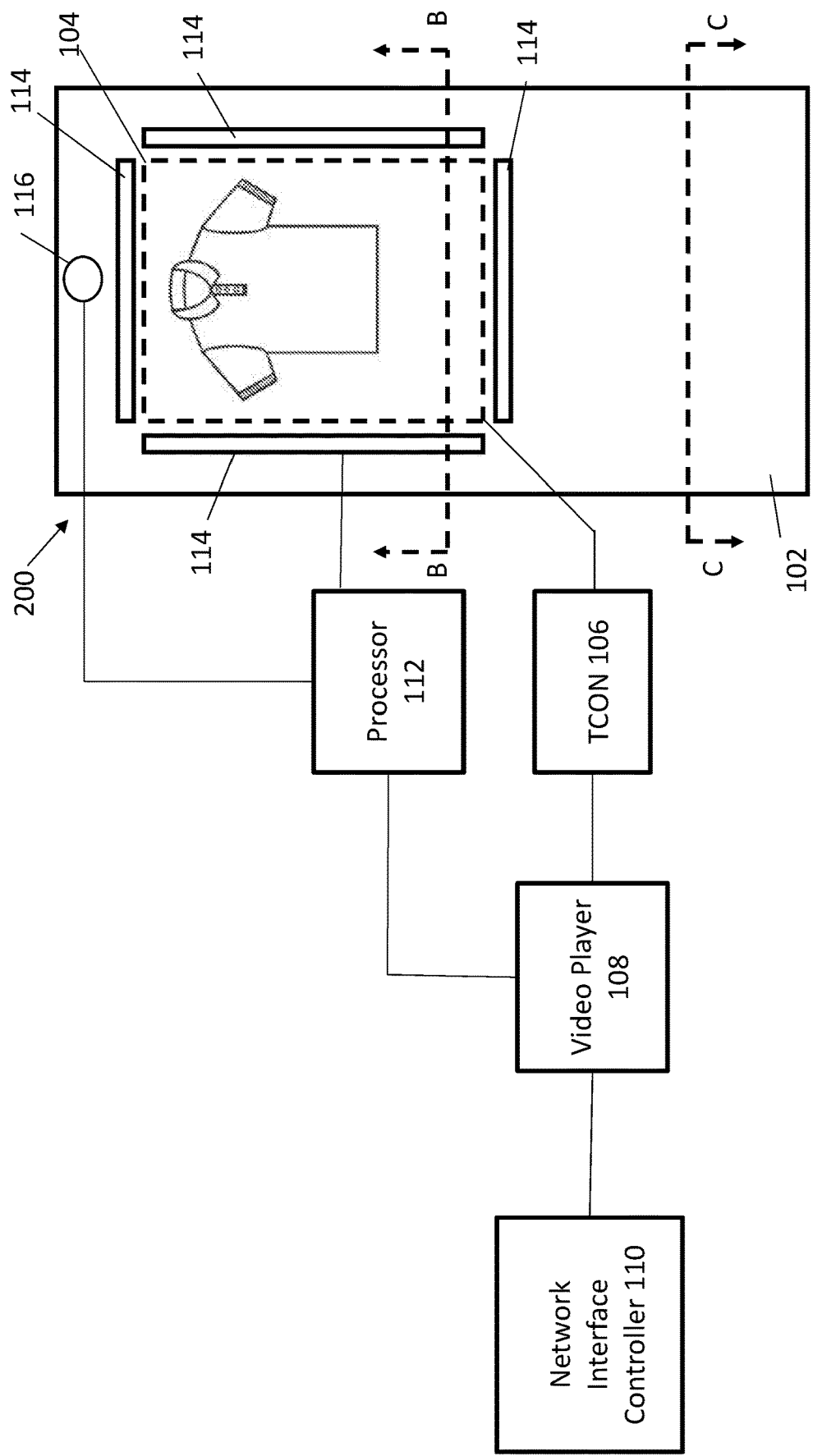
FIG. 3 is a simplified block diagram of another exemplary embodiment of the mirrored display also indicating section lines B-B and C-C.

FIG. 3 In another exemplary embodiment, a mirrored display 200 may be similar to the mirrored display 100 of FIG. 1 with the addition of several features to increase interactivity and provide other desirable benefits. A sensor 116 may be mounted to the cabinet of the mirrored display 200 or be located behind the two-way portion of the optical stack 102. The sensor 116 may be a motion sensor, proximity sensor, or the like and may be configured to detect if a user/viewer is standing in front of, or in close proximity with, the mirrored display 200. In other exemplary embodiments, the sensor 116 may further comprise an ambient light sensor and may adjust the illumination level of the electronic display 104. Regardless, the sensor 116 may be in electrical connection (wired or wireless) with a processor 112, which may be in electrical connection (wired or wireless) with the video player 108.

In exemplary embodiments the electronic display 104 may include touch screen technology, preferably a capacitive touch screen, and the processor 112 may also be in electrical communication with a plurality of touch inputs 114. The touch inputs 114 may receive the user's input and the processor 112 may determine the location, type, duration, or the like of the user's touch and direct the video player 108 to make appropriate changes to the image being displayed on the electronic display 104.

Additionally, the mirrored display 200 may comprise a network interface controller 110. The network interface controller 110 may be in electrical connection (wired or wireless) with the video player 108 or another component of the mirrored display 200. The network interface controller 110 may connect the mirrored display 200 to a communications network such as an internet, intranet, satellite communications network, cellular network, the world wide web, or the like. In this way, the mirrored display 200 may receive remote updates for the images to be displayed or the operation of the mirrored display 200 generally.

Figure 4:
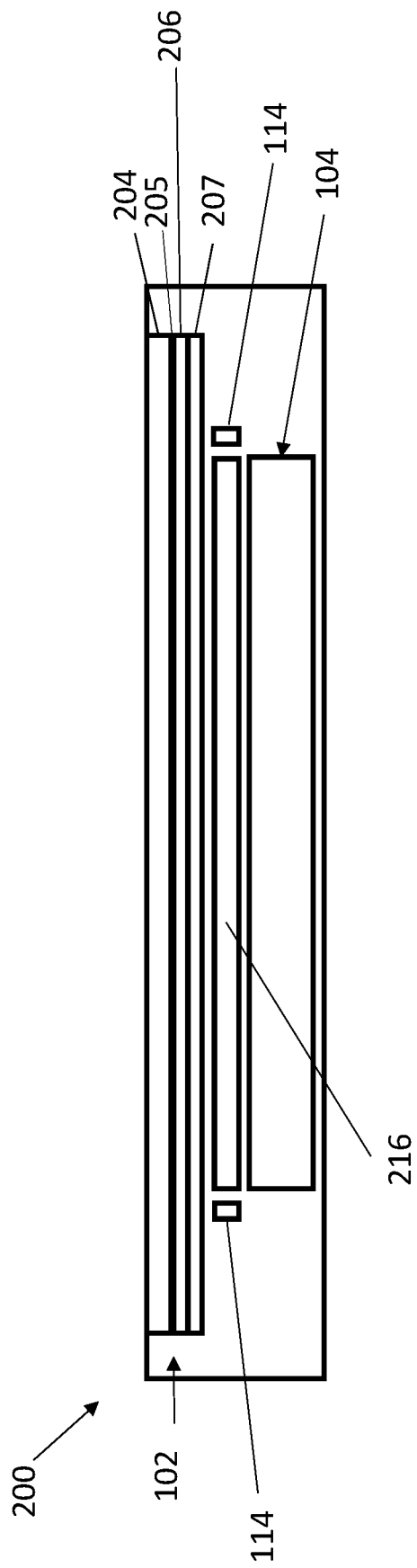
FIG. 4 is a detailed sectional view taken along section line B-B of FIG. 3.

FIG. 4 A detailed sectional view taken along section line B-B of FIG. 3 reveals the various layers that comprise the optical stack 102 and the electronic display 104 of the mirrored display 200. These layers may be the same as those illustrated and described with respect to FIG. 2 with the addition of a touch screen layer 216 located below the glass panel 204. The touch screen layer 216 may comprise a grid of wires and electrodes configured to detect the location of a user's finger or other appendage. The touch screen layer 216 may be electrically connected to the touch inputs 114.

Figure 5:
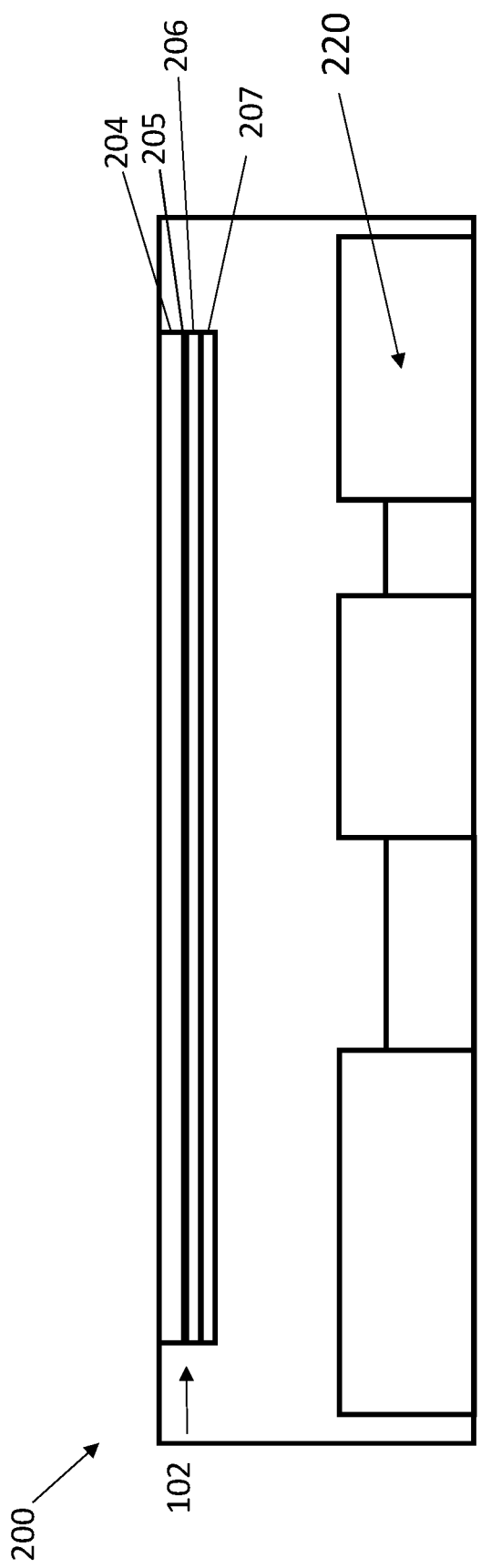
FIG. 5 is a detailed sectional view taken along section line C-C of FIG. 3.

FIG. 5 A detailed sectional view taken along section line C-C of FIG. 3 reveals the internal structure and various layers of the mirrored display 200 in the areas where the electronic display 104 is not located below the optical stack 102. In these areas, only the optical stack 102, comprising of the layers shown and described above, may be present. This may result in a cavernous area where the electronic display 104 would other reside. In exemplary embodiments, various electronic components 220 such as, but not limited to, power supplies, cooling or thermal management systems, the processor 112, TCON 106, video player 108, and network interface controller 110 could be secured in this area, though such is not required. In other embodiments, the various electronic components 220 could be positioned above or below the optical stack 102, rather than behind it as shown in this Figure.

Figure 6:
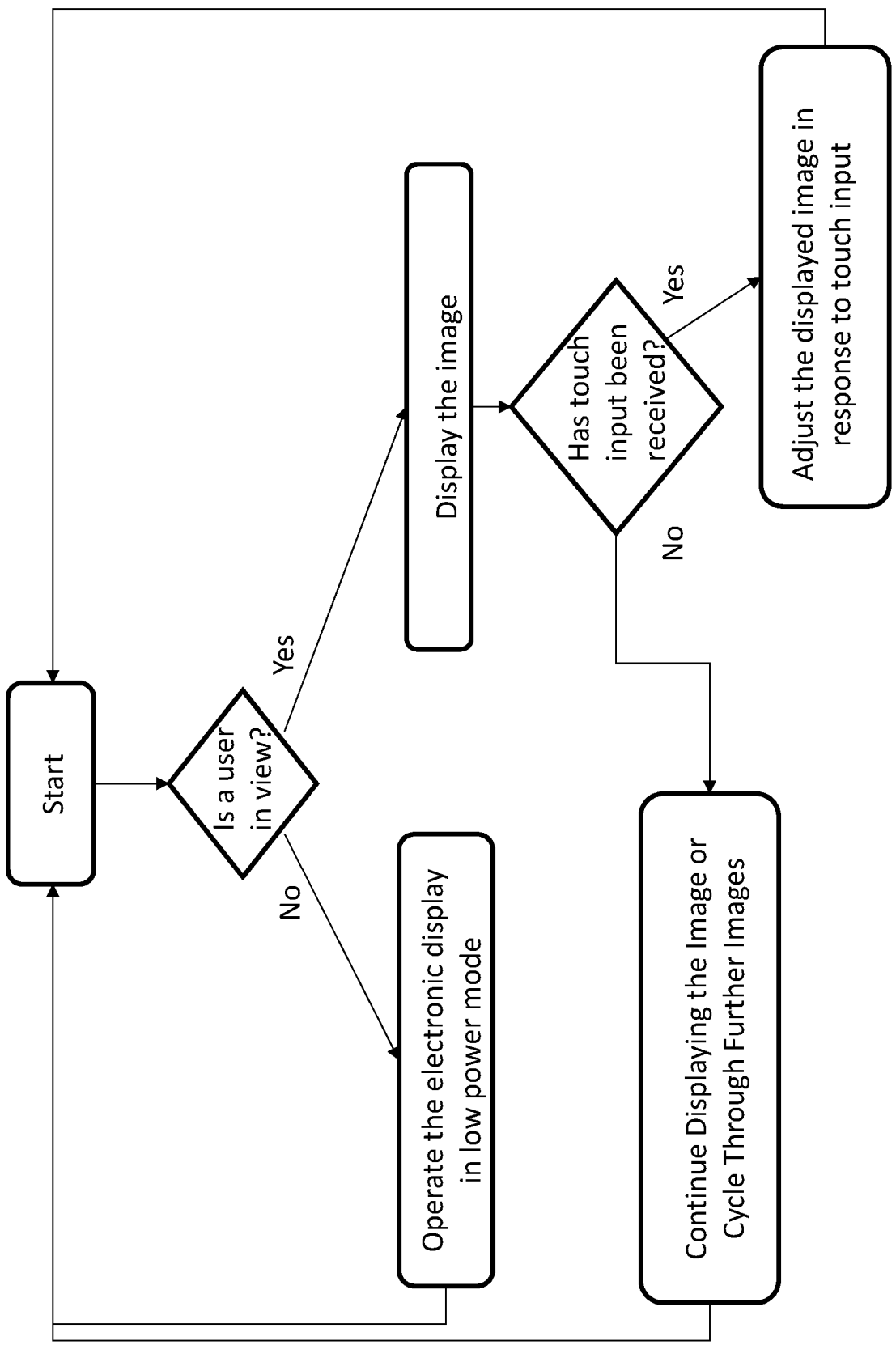
FIG. 6 is an exemplary logical flowchart for operating the mirrored display of either FIG. 1 or FIG. 3.

FIG. 6 The mirrored display 200 may be in communication with the sensor 116 such that it detects whether the user/viewer is in view of the mirrored display 200. If the user is not in view, the mirrored display 200 may be driven in a low power mode (little or no luminance produced by the display). In exemplary embodiments, the lower power mode may include driving the backlight (if used) for the electronic display 104 at a reduced level or a level where no power is applied. The lower power mode may continue until the user is in view or within the proximity of viewing the mirrored display 200.

If the user is in view, the mirrored display 200 may display an image, such as advertising image, a retail item, or the like. In exemplary embodiments, the mirrored display 200 may also display a menu selection or other interactive element for the viewer to engage with and provide touch input. The mirrored display 200 may monitor the touch inputs 114 to determine if touch input from the user has been received. If no touch input has been received, the mirrored display 200 may continue to display the same or different images, including interactive elements, based on pre-programmed instructions. If touch input has been received, the processor 112 may interpret the touch input and direct the video player 108 to adjust the displayed image accordingly. The video player 108 may send the adjusted images to the TCON 106 for display on the electronic display 104.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. An apparatus for presenting images, said apparatus comprising:
    an electronic display having a viewing area for displaying the images, said electronic display comprising a layer of liquid crystals and a number of illumination elements;
    a cover layer having a surface area at least as large as said viewing area, wherein said cover layer is positioned in front of the electronic display such that the surface area covers the viewing area;
    a reflective material located at said cover layer which is less than fully reflective at areas above the viewing area;
    a sensor configured to detect an object within a detection area proximate to said mirrored display; and
    one or more processors electrically connected with said sensor and said electronic display, wherein said one or more processors are configured to operate said mirrored display at multiple power modes including a first power mode comprising driving said number of illumination elements at a first non-zero power level and, following the receipt of data from said sensor indicating detection of the object within the detection area, direct said mirrored display to operate at a second power mode, wherein the second power mode includes supplying additional power to the mirrored display compared to the first power mode and driving said number of illumination elements at a second non-zero power level which is greater than said first non-zero power level.

2. The apparatus of claim 1 further comprising:
    a housing at least partially surrounding the electronic display, the cover layer, and the reflective layer.

3. The apparatus of claim 1 wherein:
    said reflective material is half silvered at said areas above the viewing area.

4. The apparatus of claim 3 wherein:
    said reflective material is fully silvered at a remaining area beyond said areas above the viewing area.

5. The apparatus of claim 4 further comprising:
    an opaque material located below the fully silvered portions of the reflective layer.

6. The apparatus of claim 5 wherein:
    the surface area is at least twice the size of the viewing area.

7. The apparatus of claim 1 further comprising:
    a touch screen positioned in front of said viewing area, wherein said touch screen is configured to receive touch input, wherein at least one of said one or more processors is electrically connected with said touch screen and configured to alter the image displayed on the electronic display based upon the received touched input.

8. The apparatus of claim 1 further comprising:
    a timing and control board electrically connected with said electronic display;
    a video player electrically connected with at least one of said one or more processors; and
    a network interface controller electrically connected with said electronic display.

9. The apparatus of claim 1 further comprising:
a first optical film located at said cover layer; and
a second optical film located at said cover layer.

10. The apparatus of claim 1 wherein:
said illumination elements are located about a perimeter of the electronic display.

11. The apparatus of claim 1 wherein:
said sensor comprises a motion sensor; and
said object comprises a human being.

12. The apparatus of claim 1 wherein:
said illumination elements comprise light emitting diodes.

13. The apparatus of claim 1 wherein:
said reflective material comprises a primary material selected from the group consisting of: silver, tin, nickel, mercury, aluminum, aluminum oxide, gold, chrome, silicon oxide, and silicon nitrides.

14. A system for presenting images on a mirrored display, said system comprising:
an electronic display defining a viewing area for displaying the images, wherein said electronic display is illuminable by way of a number of illumination elements;
a transparent cover defining a surface area which is at least twice as large as the viewing area, wherein said transparent cover is positioned in front of the electronic display assembly such that the surface area covers the viewing area;
a reflective material deposited on at least a majority of said transparent cover, wherein said reflective material forms a less than fully reflective layer where the reflective material is located above the viewing area and a fully reflective layer on a remaining area;
a timing and control board electrically connected to said electronic display;
a video player electrically connected to said timing and control board;
a sensor configured to detect an object within a detection area proximate to the mirrored display;
one or more processors in electrical connection with said sensor and said electronic display, wherein at least one of said one or more processors is configured to alter the images displayed at the electronic display after the sensor detects the object within the detection area by directing the power supplied to the electronic display to be increased from a first, non-zero power level to a second, non-zero power level, wherein said second power level is greater than said first power level, and where operation of said electronic display at said second power level increases the visibility of the images displayed at the electronic display.

15. The system of claim 14 further comprising:
a touch screen coextensive with at least a portion of said electronic display, wherein at least one of said one or more processors is in electrical connection with said touch screen and is configured to alter the image based upon user input received at the touch screen.

16. An apparatus for presenting images on a mirrored display, said apparatus comprising:
an electronic display having a viewing area for displaying the images;
a cover layer having a surface area at least as large as said viewing area, wherein said cover layer is positioned in front of the electronic display such that the surface area covers the viewing area;
a reflective material located at said cover layer which is less than fully reflective at areas above the viewing area to permit viewing of the images displayed at said electronic display;
a sensor capable of detecting an object within a detection area proximate to said mirrored display;
one or more processors electrically connected with said sensor and said electronic display, wherein said one or more processors are configured to operate said mirrored display at multiple power modes including a first power mode and, following the receipt of data from said sensor indicating detection of the object within the detection area, direct said mirrored display to operate at a second power mode, wherein the second power mode includes supplying additional power to the mirrored display compared to the first power mode; and
a touch screen positioned in front of said viewing area, wherein said touch screen is configured to receive touch input, wherein at least one of said one or more processors is electrically connected with said touch screen and configured to alter the image displayed on the electronic display based upon the received touched input.

17. An apparatus for presenting images on a mirrored display, said apparatus comprising:
an electronic display having a viewing area for displaying the images;
a cover layer having a surface area at least as large as said viewing area, wherein said cover layer is positioned in front of the electronic display such that the surface area covers the viewing area;
a first optical film located at said cover layer;
a second optical film located at said cover layer;
a reflective material located at said cover layer which is less than fully reflective at areas above the viewing area to permit viewing of the images displayed at said electronic display;
a sensor capable of detecting an object within a detection area proximate to said mirrored display;
one or more processors electrically connected with said sensor and said electronic display, wherein said one or more processors are configured to operate said mirrored display at multiple power modes including a first power mode and, following the receipt of data from said sensor indicating detection of the object within the detection area, direct said mirrored display to operate at a second power mode, wherein the second power mode includes supplying additional power to the mirrored display compared to the first power mode.

* * * * *